United States Patent [19]
Young et al.

[11] Patent Number: 4,680,124
[45] Date of Patent: Jul. 14, 1987

[54] POLYACRYLATE SCALE INHIBITION

[75] Inventors: Paul R. Young, Wheaton; Mary E. Koutek, Westchester; John A. Kelly, Crystal Lake, all of Ill.

[73] Assignee: Nalco Chemical Company, Naperville, Ill.

[21] Appl. No.: 1,928

[22] Filed: Jan. 8, 1987

[51] Int. Cl.$^4$ ................................................ C02F 5/14
[52] U.S. Cl. .................................... 210/697; 210/699; 252/181
[58] Field of Search .............................. 210/697–701; 252/180, 181

[56] References Cited

U.S. PATENT DOCUMENTS

| | | | |
|---|---|---|---|
| 3,890,228 | 6/1975 | Hwa et al. | 210/701 X |
| 4,457,847 | 7/1984 | Lorenc et al. | 210/698 |
| 4,502,978 | 3/1985 | Romberger et al. | 210/697 X |
| 4,566,973 | 1/1986 | Masler, III et al. | 210/701 |
| 4,576,722 | 3/1986 | Gaylor et al. | 210/699 |
| 4,634,532 | 1/1987 | Logan et al. | 210/697 |

Primary Examiner—Tom Wyse
Attorney, Agent, or Firm—John G. Premo; Anthony L. Cupoli; Donald G. Epple

[57] ABSTRACT

Small amounts of certain water-soluble phosphorous compounds prevent calcium polyacrylate scale.

6 Claims, No Drawings

POLYACRYLATE SCALE INHIBITION

INTRODUCTION

It is now common to treat boilers in accordance with the teachings of U.S. Pat. No. 4,457,847, which is incorporated herein by reference, with high dosages of certain carboxylic acid polymers to prevent and remove scale. The preferred polymers taught to prevent scale in U.S. Pat. No. 4,457,847 are usually acrylic acid or methacrylic acid polymers or water-soluble copolymers of these acrylates. This group of polymers usually are of low molecular weight, e.g. 500–50,000 with 1,000–30,000 being preferred. These polymers for the purpose of this invention as well as other water-soluble acrylic acid or methacrylic acid polymers are simply referred to as polyacrylates. Commercially, dosages are often 3 ppm or greater per ppm of hardness present in the boiler waters.

Treatments of the type described above are subject to errors such as dosage errors and mechanical feed equipment failure. Such errors can result in either:
A. Accidental low dosage of the polymer, or,
B. Upsets where excessive amounts of calcium hardness are temporarily present in the boiler water.

When either of the above two conditions occur, the carboxylate polymers can form calcium-polyacrylate scale on heat transfer surfaces. It would be beneficial if there was a simple and effective method for preventing calcium polyacrylate from forming scale under these circumstances.

The invention provides a method for preventing calcium polyacrylate scaling.

THE INVENTION

The invention comprises a method of preventing the formation of calcium polyacrylate scale on industrial heat transfer surfaces which are in contact with water which contains a scale-forming species of calcium polyacrylate which comprises treating the water with a phosphorous compound from the group consisting of compounds capable of producing phosphate ions and water-soluble phosphonates with the amount of phosphorous compound being less than the amount of calcium polyacrylate.

To our knowledge, none of the phosphorous-containing materials found effective in this invention have been used specifically as calcium polyacrylate inhibitors. However, combining phosphates for precipitation with polymers for dispersion is well-known. See Chapter 7 of *Water-Formed Scale Deposits*, by J. C. Cowan and D. J. Weintritt, publised by Gulf Publishing Company, Houston, Tx., 1976. This is a very different technology from that employed in U.S. Pat. No. 4,457,847, where a stoichiometric excess of polymer solubilizes calcium salts. Insufficient polymer can result in precipitation of calcium polyacrylate, which has been reported as a problem scale in some boilers using the polymers disclosed in U.S. Pat. No. 4,457,847. In the presence of small dosages of phosphate, this scale is virtually eliminated.

THE INORGANIC PHOSPHATES AND THE ORGANIC PHOSPHONATES

Inorganic Phosphates

Inorganic phosphates used in this invention are either the acid form of inorganic phosphate or any of their metal, ammonium or amine salts. The inorganic phosphates (ortho and condensed) of this invention are chosen from the group:
1. Orthophosphate
2. Pyrophosphate
3. Tripolyphosphate
4. Hexametaphosphate
5. Higher molecular weight polyphosphate oligomers Any of the above inorganic phosphates may be used alone or in combination. The preferred inorganic phosphate are the polyphosphates, particularly tripolyphosphate. Trisodium phosphate represents a preferred orthophosphate. Phosphoric acid is the least desirable since it can cause an undesirable pH change in the boiler water. Also, compounds capable of furnishing phosphate cations in the boiler water, e.g. phosphate esters or inorganic phosphites, may also be used.

The Organic Phosphonates

Generally any water-soluble phosphonate may be used. See U.S. Pat. No. 4,303,568 which lists a number of representative phosphonates. The disclosure is incorporated herein by reference.

The organo-phosphonic acid compounds are those having a carbon to phosphorus bond, i.e.,

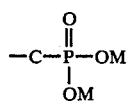

Compounds within the scope of the above description generally are included in one of perhaps 3 categories which are respectively expressed by the following general formulas:

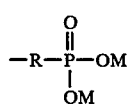

where R is lower alkyl having from about one to six carbon atoms, e.g., methyl, ethyl, butyl, propyl, isopropyl, pentyl, isopentyl and hexyl; substituted lower alkyl of from one to six carbon atoms, e.g., hydroxyl and amino-substituted alkyls; a mononuclear aromatic (aryl) radical, e.g., phenyl, benzene, etc., or a substituted mononuclear aromatic compound, e.g., hydroxyl, amino, lower alkyl subsitituted aromatic, e.g., benzyl phosphonic acid; and M is a water-soluble cation, e.g., sodium, potassium, ammonium, lithium, etc. or hydrogen.

Specific examples of compounds which are encompassed by this formula include:

methylphosphonic acid

ethylphosphonic acid

2-hydroxyethylphosphonic acid

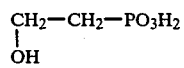

2-amino-ethylphosphonic acid

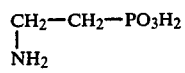

isopropylphosphonic acid

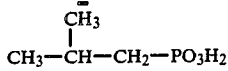

benzene phosphonic acid $C_6H_5—PO_3H_2$ benzylphosphonic acid $C_6H_5CH_2PO_3H_2$

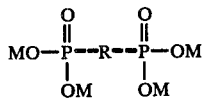

wherein $R_1$ is an alkylene having from about one to about 12 carbon atoms or a substituted alkylene having from about 1 to about 12 carbon atoms, e.g., hydroxyl, amino etc. substituted alkylenes, and M is as earlier defined above.

Specific exemplary compounds and their respective formulas which are encompassed by the above formula are as follows:

methylene diphosphonic acid $H_2O_3P—CH_2—PO_3H_2$ ethylidene diphosphonic acid $H_2O_3P—CH(CH_3)PO_3H_2$ isopropylidene diphosphonic acid $(CH_3)_2C(PO_3H_2)_2$ 1-hydroxy, ethylidene diphosphonic acid (HEDP), (a preferred phosphonate)

hexamethylene diphosphonic acid $H_2O_3P—CH_2(CH_2)_4CH_2—PO_3H_2$ trimethylene diphosphonic acid $H_2O_3P—(CH_2)_3—PO_3H_2$ decamethylene diphosphonic acid $H_2O_3P—(CH_2)_{10}—PO_3H_2$ 1-hydroxy, propylidene diphosphonic acid $H_2O_3PC(OH)CH_2(CH_3)PO_3H_2$ 1,6-dihydroxy, 1,6-dimethyl, hexamethylene diphosphonic acid $H_2O_3PC(CH_3)(OH)(CH_2)_4C(CH_3)(OH)PO_3H_2$ dihydroxy, diethyl ethylene diphosphonic acid

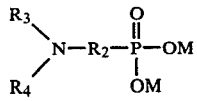

where $R_2$ is a lower alkylene having from about one to about four carbon atoms, or an amine or hydroxy substituted lower alkylene; $R_3$ is $[R_2—PO_3M_2]H$, OH, amino, substituted amino, an alkyl having from one to six carbon atoms, a substituted alkyl of from one to six carbon atoms (e.g., OH, $NH_2$ substituted) a mononuclear aromatic radical and a substituted mononuclear aromatic radical (e.g., OH, $NH_2$ substituted); $R_4$ is $R_3$ or the group represented by the formula

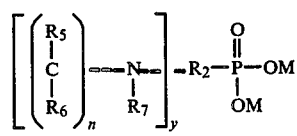

where $R_5$ and $R_6$ are each hydrogen, lower alkyl of from about one to six carbon atoms, a substituted lower alkyl (e.g., OH, $NH_2$ substituted), hydrogen, hydroxyl, amino group, substituted amino group, a mononuclear aromatic radical, and a substituted mononuclear aromatic radical (e.g., OH and amine substituted); R is $R_5$, $R_6$, or the group $R_2—PO_3M_2$ ($R_2$ is as defined above); n is a number of from 1 through about 15; y is a number of from about 1 through about 14; and M is as earlier defined.

Compounds or formulas therefore which can be considered exemplary for the above formulas are as follows:

nitrilo-tri(methylene phosphonic acid)

$N(CH_2PO_3H_2)_3$ imino-di(methylene phosphonic acid)

$NH(CH_2PO_3H_2)_2$ n-butyl-amino-di(methyl phosphonic acid)

$C_4H_9N(CH_2PO_3H_2)_2$ decyl-amino-di(methyl phosphonic acid)

$C_{10}H_{21}N(CH_2PO_3H_2)_2$ trisodium-pentadecyl-amino-di-methyl phosphate $C_{15}H_{31}N(CH_2PO_3HNa)(CH_2PO_3Na_2)$ n-butyl-amino-di(ethyl phosphonic acid)

$C_4H_9N(CH_2CH_2PO_3H_2)_2$ tetrasodium-n-butyl-amino-di(methyl phosphate)

$C_4H_9N(CH_2PO_3Na_2)_2$ triammonium tetradecyl-amino-di(methyl phosphate)

$C_{14}H_{29}N(CH_2PO_3(NH_4)_2)CH_2PO_3HNH_4$ phenyl-amino-di(methyl phosphonic acid)

$C_6H_5N(CH_2PO_3H_2)_2$ 4-hydroxy-phenyl-amino-di(methyl phosphonic acid)

$HOC_6H_4N(CH_2PO_3H_2)_2$ phenyl propyl amino-di(methyl phosphonic acid)

$C_6H_5(CH_2)_3N(CH_2PO_3H_2)_2$ tetrasodium phenyl ethyl amino-di(methyl phosphonic acid)

$C_6H_5(CH_2)_2N(CH_2PO_3Na_2)_2$ ethylene diamine tetra(methyl phosphonic acid)

$(H_2O_3PCH_2)_2N(CH_2)_2N(CH_2PO_3H_2)_2$ trimethylene diamine tetra(methyl phosphonic acid)

$(H_2O_3PCH_2)_2N(CH_2)_3N(CH_2PO_3H_2)_2$ hepta methylene diamine tetra(methyl phosphonic acid)

$(H_2O_3PCH_2)_2N(CH_2)_7N(CH_2PO_3H_2)_2$ decamethylene diamine tetra(methyl phosphonic acid)

$(H_2O_3PCH_2)_2N(CH_2)_{10}N(CH_2PO_3H_2)_2$ tetradecamethylene diamine tetra(methyl phosphonic acid)

$(H_2O_3PCH_2)_2N(CH_2)_{14}N(CH_2PO_3H_2)_2$ ethylene diamine tri(methyl phosphonic acid)

$(H_2O_3PCH_2)_2N(CH_2)_2NHCH_2PO_3H_2$ ethylene diamine di(methyl phosphonic acid)

$H_2O_3PCH_2)_2NH(CH_2)_2NHCH_2PO_3H_2$ n-hexyl amine di(methyl phosphonic acid)

$C_6H_{13}N(CH_2PO_3H_2)_2$ diethylamine triamine penta(methyl phosphonic acid)

$(H_2O_3PCH_2)_2N(CH_2)_2N(CH_2PO_3H_2)-(CH_2)_2N(CH_2PO_3H_2)_2$ ethanol amine di(methyl phosphonic acid)

$HO(CH_2)_2N(CH_2PO_3H_2)_2$ n-hexyl-amino(isopropylidene phosphonic acid)methylphosphonic acid $C_6H_{13}N(C(CH_3)_2PO_3H_2)(CH_2PO_3H_2)$ trihydroxy methyl, methyl amine di(methyl phosphonic acid)

$(HOCH_2)_3CN(CH_2PO_3H_2)_2$ triethylene tetra amine hexa(methyl phosphonic acid)

$(H_2O_3PCH_2)_2N(CH_2)_2N(CH_2PO_3H_2)(CH_2)_2N(CH_2PO_3H_2)(CH_2)_2N(CH_2PO_3H_2)_2$ monoethanol, diethylene triamine tri(methyl phosphonic acid)

$HOCH_2CH_2N(CH_2PO_3H_2)(CH_2)_2NH(CH_2)_2N-CH_2PO_3H_2)_2$ chloroethylene amine di(methyl phosphonic acid)

$ClCH_2CH_2N((CH_2PO(OH)_2)_2$

The above compounds are included for illustration purposes and are not intended to be a complete listing of the compounds which are operable within the confines of the invention.

Preferred phosphonates are the two compounds:
A. 2-phosphonobutane-1, 2, 4-tricarboxylic acid and
B. 1-hydroxyethylidene-1, 1-diphosphonic acid.

DOSAGE

A typical dosage, when an inorganic phosphate such as trisodium phosphate would be used, would be one part of phosphate per 10 parts of polymer depending upon the particular calcium polyacrylate and the phosphate or phosphonate used. The dosage should be less then one part of phosphate as $PO_4$ per part of calcium polyacrylate. The phosphorous containing compounds would be added to the boiler feed makeup water. A typical weight dosagae range would be 3:1 to 75:1 of polymer to phosphate. A preferred range is 5:1 to 50:1.

EVALUATION OF THE INVENTION

Boiler Tests

Several boiler tests[1] were run at various pressures using a 70 mole % acrylic acid/30 mole % acrylamide copolymer having a weight average molecular weight of about 30,000 with trisodium phosphate ($Na_3PO_4:12-H_2O$) in a ratio of 23/1 active polymer to phosphate (as $PO_4$).

[1] See U.S. Pat. No. 4,457,847 for details of these test procedures. See also the paper, "The Investigation of Scaling and Corrosion Mechanisms Using Process Simulation," by J. A. Kelly, P. T. Colombo, and G. W. Flasch, paper No. IWC-80-10, given at the 41st Annual Meeting, Interntational Water Conference, Pittsburgh, Pa., Oct. 20–22, 1980.

The dosage of copolymer was varied to check the performance. Tables I and II summarize the test results. A comparison of test nos. 1 and 2, run at a treatment ratio of 1.2 ppm active polymer/hardness, show improved hardness recovery when phosphate was present. Also, test no. 2 shows that in the presence of phosphate, calcium polyacrylate was not formed. Without phosphate (test no. 1), heavy deposition occurred.

Test no. 3, at a 0.6 ppm active polymer/hardness ratio, produced "normal" boiler scale (calcium sulfate, calcium and magnesium silicates), but no calcium polyacrylate.

Test nos. 4 and 5 were run at 2.4 ppm active polymer/hardness ratio, and 4.8 ppm active polymer/hardness, respectively. Hardness recovery was excellent in both tests. Also, some clean-up of existing deposits was noted at 4.8 ppm active polymer/hardness ratio.

Table II shows test results from lower pressure boiler studies. In both cases, polymer recovery is much poorer without phosphate, indicative of polyacrylate deposit formation.

The phosphonates HEDP[1] and PBTC[2] gave results similar to those achieved using trisodium phosphate.

[1]HEDP-1-hydroxyl, ethylidene diphosphonic acid
[2]PBTC-2-phosphonobutane-1,2,4-tricarboxylic acid Results of screening tests indicate phosphate is a highly effective inhibitor. Ten ppm phosphate reduces turbidity more than a 40 ppm reduction in calcium con-

TABLE I
600 psig Boiler Test Results

| Test No. | Treatment Ratio (ppm active polymer/ppm hardness) | Phosphate (ppm as PO$_4$) | Firerod condition | Recovery (%) Ca | Mg | SiO$_2$ |
|---|---|---|---|---|---|---|
| 1 | 1.2 | — | calcium polyacrylate deposit | 77 | 44 | 94 |
| 2 | 1.2 | 0.23 | clean | 88 | 69 | 72 |
| 3 | 0.6 | 0.11 | calcium sulfate calcium/magnesium silicates | 12 | 3 | 52 |
| 4 | 2.4 | 0.5 | slight film of deposit | >100 | >100 | >100 |
| 5 | 4.8 | 0.84 | clean | >100 | >100 | >100 |

TABLE II

| Test No. | Pressure (psig) | Treatment Ratio (ppm active polymer/ppm hardness) | Phosphate (ppm as PO$_4$) | Firerod condition | Recovery (%) Ca | Mg | SiO$_2$ | Polymer |
|---|---|---|---|---|---|---|---|---|
| 6 | 250 | 0.6 | 0.1 | slight film of deposit | 51 | 5 | 55 | 83 |
| 7 | 250 | 0.6 | — | slight film of deposit | 55 | 3 | 48 | 31 |
| 8 | 100 | 0.6 | 0.1 | slight film of deposit | 77 | 14 | 53 | >100 |
| 9 | 100 | 0.6 | — | slight film of deposit | 71 | 5 | 70 | 54 |

Non-Boiler Tests

Stock solutions were prepared from reagent grade chemicals or commercially available products. Most experiments used a polyacrylate/acrylamide copolymer of 30,000–50,000 molecular weight. A four-beaker hot plate was used for comparative screening tests. For the screening tests polymer, inhibitor, and sodium hydroxide were added to a beaker and diluted to 100 ml. 100 ml calcium chloride solution was added and the resulting solution heated to boiling.

A clear solution containing calcium and polyacrylate will gradually become turbid as it is heated. If sufficient excess polymer is present, however, the precipitate is solubilized and turbidity is not observed. This is the basis of the boiler program in U.S. Pat. No. 4,457,847. If the Ca:polymer ratio increases, Ca:polymer can again precipitate. The turbidity observed in beaker tests roughly parallels the amount of deposit obtained under boiler conditions.

It was observed that dilute calcium-polyacrylate-phosphate solutions are cloudier when phosphate is omitted. Various Ca:polymer:phosphate ratios were investigated to verify this. A 100 ppm Ca:400 ppm polymer solution was hazy without phosphate, but this haze did not develop when as little as 0.5 ppm phosphate was present. A 400 ppm Ca:200 ppm polymer solution without phosphate yielded a very turbid liquid and a sticky precipitate. With 10 ppm phosphate, a loose floc formed in a moderately turbid liquid.

centration. Increasing the amount of phosphate increases the effect. Phosphonates are somewhat less effective, while many anions are inactive. Phosphate also inhibits calcium precipitation of polymethacrylates and polysulfonates.

Having thus described our invention, we claim:

1. The invention comprises a method of preventing the formation of calcium polyacrylate scale on industrial heat transfer surfaces which are in contact with water which contains a scale-forming species of calcium polyacrylate which comprises treating the water with a phosphorous compound from the group consisting of compounds capable of producing phosphate ions and water-soluble phosphonates with the amount of phosphorous compound being less than the amount of calcium polyacrylate.

2. The method of claim 1 wherein the compound capable of producing phosphate ion is an alkali metal polyphosphate.

3. The method of claim 2 wherein the polyphosphate is an alkali metal tripolyphosphate.

4. The method of claim 1 wherein the compound capable of producing phosphate ion is an orthophosphate.

5. The method of claim 4 wherein the orthophosate is trisodium phosphate.

6. The method of claim 1 wherein the phosphonate is from the grouop consisting of 1-hydroxyl, ethylidene diphosphonic acid and 2-phosphonobutane-1,2,4-tricarboxylic acid.

* * * * *